United States Patent
Metz

(10) Patent No.: US 10,277,085 B2
(45) Date of Patent: Apr. 30, 2019

(54) SUPERCHARGING APPARATUS FOR A COMBUSTION ENGINE

(71) Applicant: BorgWarner Inc., Auburn Hills, MI (US)

(72) Inventor: Dietmar Metz, Meckenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 341 days.

(21) Appl. No.: 14/900,270

(22) PCT Filed: Jun. 25, 2014

(86) PCT No.: PCT/US2014/043991
§ 371 (c)(1),
(2) Date: Dec. 21, 2015

(87) PCT Pub. No.: WO2014/210094
PCT Pub. Date: Dec. 31, 2014

(65) Prior Publication Data
US 2016/0156236 A1    Jun. 2, 2016

(30) Foreign Application Priority Data

Jun. 28, 2013    (DE) .................. 10 2013 010 861

(51) Int. Cl.
*H02K 3/04*    (2006.01)
*H02K 3/14*    (2006.01)
(Continued)

(52) U.S. Cl.
CPC .............. *H02K 3/04* (2013.01); *F02B 33/40* (2013.01); *F02B 39/10* (2013.01); *F04D 25/06* (2013.01);
(Continued)

(58) Field of Classification Search
CPC ... H02K 3/04; H02K 3/14; H02K 7/14; F02B 33/40; F02B 39/10; F04D 25/06; F04D 29/284; F04D 29/4206
See application file for complete search history.

(56) References Cited

U.S. PATENT DOCUMENTS 4,253,031 A    2/1981    Frister
6,806,611 B2    10/2004    Bharaj et al.
(Continued)

FOREIGN PATENT DOCUMENTS

CN    101309024 A    11/2008
CN    101515741 A    8/2009
(Continued)

OTHER PUBLICATIONS

Supplementary European Search Report dated Apr. 19, 2017, in European Application No. EP1481666.
(Continued)

*Primary Examiner* — Philip E Stimpert
(74) *Attorney, Agent, or Firm* — Eric L. Doyle; Stephan A. Pendorf; Patent Central LLC

(57) ABSTRACT

A supercharging apparatus (20) for a combustion engine (21) having an electrically drivable compressor (1), which has a compressor housing (2) in which a compressor wheel (3) is arranged, which compressor wheel is fastened on one end (4) of a rotor shaft (5), and which has a compressor housing rear wall (6), which is arranged behind the compressor wheel (3) and closes the compressor housing (2); an electric motor (7); and a stator winding (12), which has a line (21) formed from a multiplicity of litz wires (22, 23, 24). The litz wires (22, 23, 24) of the line (21) have a first degree of twisting in an end winding region (25) of the stator winding (12) and have a second degree of twisting in a
(Continued)

magnetically active section (I, II, III, IV). The first degree of twisting is higher than the second degree of twisting.

14 Claims, 3 Drawing Sheets

(51) Int. Cl.
    *H02K 7/14*     (2006.01)
    *F02B 33/40*     (2006.01)
    *F02B 39/10*     (2006.01)
    *F04D 25/06*     (2006.01)
    *F04D 29/28*     (2006.01)
    *F04D 29/42*     (2006.01)

(52) U.S. Cl.
    CPC ....... *F04D 29/284* (2013.01); *F04D 29/4206* (2013.01); *H02K 3/14* (2013.01); *H02K 7/14* (2013.01)

(56) References Cited

U.S. PATENT DOCUMENTS

| | | | |
|---|---|---|---|
| 7,402,934 B1* | 7/2008 | Gabrys | H02K 3/345 310/179 |
| 2002/0134082 A1* | 9/2002 | Bolz | F02B 33/40 60/608 |
| 2010/0117481 A1 | 5/2010 | Greaves et al. | |
| 2010/0194231 A1 | 8/2010 | Rippel et al. | |
| 2010/0263640 A1* | 10/2010 | Armiroli | B60L 1/00 123/565 |
| 2012/0181886 A1* | 7/2012 | Osada | H02K 3/14 310/71 |
| 2015/0303755 A1 | 10/2015 | Rippel et al. | |

FOREIGN PATENT DOCUMENTS

| | | |
|---|---|---|
| EP | 1376827 A2 | 1/2004 |
| EP | 1930918 A2 | 6/2008 |
| JP | 2006014490 A | 1/2006 |
| JP | 2010268575 A | 11/2010 |
| JP | 2012062777 A | 3/2012 |
| KR | 20020075239 A | 10/2002 |
| KR | 20110074560 A | 6/2011 |

OTHER PUBLICATIONS

Korean Office Action (with English language translation) dated May 9, 2016, in Korean Patent Application No. 10-2016-7001751.

International Search Report of PCT/US2014/043991 dated Oct. 31, 2014.

Chinese Office Action (with English language translation) dated Jan. 23, 2018, in Chinese Patent Application No. 201480034209.8.

European Office Action dated Mar. 20, 2018, in European Patent Application No. 14 816 6663.3.

Chinese Office Action (with English language translation) dated Mar. 23, 2017, in Chinese Patent Application No. 201480034209.8.

* cited by examiner

SUPERCHARGING APPARATUS FOR A COMBUSTION ENGINE

The invention relates to a supercharging apparatus in accordance with the preamble of claim 1.

In conventional coil stacks of such a compressor, a plurality of lines through which an electric current flows during operation are distributed over the circumference of the coil stack. The lines consist of helically twisted wires. This twisting results in a uniform winding phase voltage of the individual wires and reduces power losses (circulating currents). Such coils can, however, only be produced in automatic fashion with a high level of complexity and, in the case of wires which are laid purely parallel to one another, disadvantages in respect of efficiency or high losses occur.

The problem addressed by the present invention therefore consists in providing a supercharging apparatus in accordance with the preamble of claim 1 which has improved efficiency.

The solution to this problem is provided by the features of claim 1.

Correspondingly, a supercharging apparatus is proposed which comprises an electrically drivable compressor having a compressor housing, wherein a compressor wheel is arranged in the housing and is fastened on one end of a rotor shaft, and wherein the compressor housing furthermore has a compressor housing rear wall. In addition, the compressor has an electric motor, which has a stator winding, which comprises a line formed from a multiplicity of litz wires. In accordance with the invention, the litz wires of the line have a first degree of twisting in an end winding region of the stator winding and a second degree of twisting in a magnetically active section. In this case, the end winding region is that region of the stator winding in which the series-connected magnetically active sections of a line are connected electrically to one another without them contributing substantially to the magnetic field of the air gap. In contrast to this, a magnetically active section of the stator winding is understood to mean a section which also and in particular contributes to the magnetic field of the air gap. A "degree of twisting" within the meaning of the present invention shall be understood to mean a degree to which the litz wires of a line are twisted with one another. This can be, for example, a number of rotations of a first litz wire about another litz wire per unit length of the line. In accordance with the invention, the first degree of twisting is higher than the second degree of twisting. In other words, the litz wires of the line under consideration are wound around one another to a greater extent in the end winding than in the magnetically active section. In this way, the end winding region of the line is provided with increased mechanical strength, while the lines in the magnetically active section are closer to one another and take up less volume. This combines advantages in terms of manufacturing which are not known from the prior art.

The dependent claims include advantageous developments of the invention.

Preferably, the first degree of twisting is twice as high as the second degree of twisting. In other words, a first litz wire has a second litz wire of the same line twined around it in the end winding twice as often as in the magnetically active section. In particular, the first degree of twisting is four times as high as the second degree of twisting. As a result, improved rigidity in the end winding region is achieved without an unnecessarily large volume being taken up within the magnetically active section.

Particularly preferably, the litz wires are configured so as to be completely untwisted in a magnetically active section of the line. In order to induce the same summation voltage in the individual parallel litz wires, it is further proposed that the twisting of the litz wires in the end winding, at least on statistical average, reduces, in particular prevents, a preferred sequence of litz wires in a multiplicity of magnetically active sections of the line in the direction of rotation of the magnetic field of the electric motor. In other words, by virtue of the twisting in the end winding, a targeted change in the sequence of litz wires between a first magnetically active section and a subsequent second magnetically active section is performed. In the case of a rotation of the rotor within the stator designed in accordance with the invention, each litz wire (on statistical average) now experiences the same induction at a respective point in time. In other words, the litz wires in the end winding are twisted in such a way that the same summation voltage is induced in the individual litz wires (from switching point to switching point). As a result, the litz wire can continue to be drawn into the respective position in the circumferential direction in automated fashion (parallel wires) and nevertheless the occurrence of lossy circulating currents or eddy currents can be prevented. Preferably, the automated manufacture should in this case be configured in such a way that the wires are distributed in the field in such a way that only very low circulating currents occur. This can be investigated and optimized by voltage measurement at open wire ends by virtue of the motor being driven actively and in the process the EMF voltage of the individual wires being measured.

Further preferably, the stator winding is in the form of a winding without an iron core. This enables a reduction in the mass of the compressor and advantages in terms of efficiency since remagnetizations within the non-existing iron core are not required.

Further preferably, the litz wires of the lines are mechanically connected to one another by means of baked enamel. Firstly, the baked enamel can be used for the electrical insulation of the litz wires with respect to one another and for the electrical insulation with respect to the surrounding environment of said litz wires. In addition, once the winding is complete, the baked enamel can be liquefied at least superficially by the action of heat, which, after a reduction in the temperature and curing of the baked enamel, results in a cohesive, electrically insulated connection between the litz wires. In this case, the individual litz wires can also comprise a plurality of layers, the outermost layer of which consists of baked enamel. A layer lying below the baked enamel can have a relatively high melting point and therefore can provide reliable electrical insulation of the litz wires with respect to one another while the baked enamel is in a liquid state.

Further preferably, the litz wires of the line can be assigned to a common electrical phase. In other words, substantially the same magnetic and electrical processes take place on the litz wires of a line at a given point in time. In this case, the electric machine can in principle use different phases, in particular three phases, in different lines in order to develop a higher power and/or a more uniform torque.

For example, the electric motor can be designed as a 12 V electric machine in order to be able to be operated on conventional vehicle electrical distribution systems.

In particular, the electric motor has a low pole pair number since it requires a high rated speed for driving the compressor. Low pole pair numbers are 1, 2, 3 or 4, for example.

In accordance with a further aspect of the present invention, a means of transportation, comprising a combustion engine and a compressor is proposed, as has been discussed in detail above. The compressor can in this case be designed to condense fresh air prior to supply in a combustion chamber of a combustion engine.

Further details, advantages and features of the present invention result from the description below relating to exemplary embodiments with reference to the drawing, in which.

Figure 1:
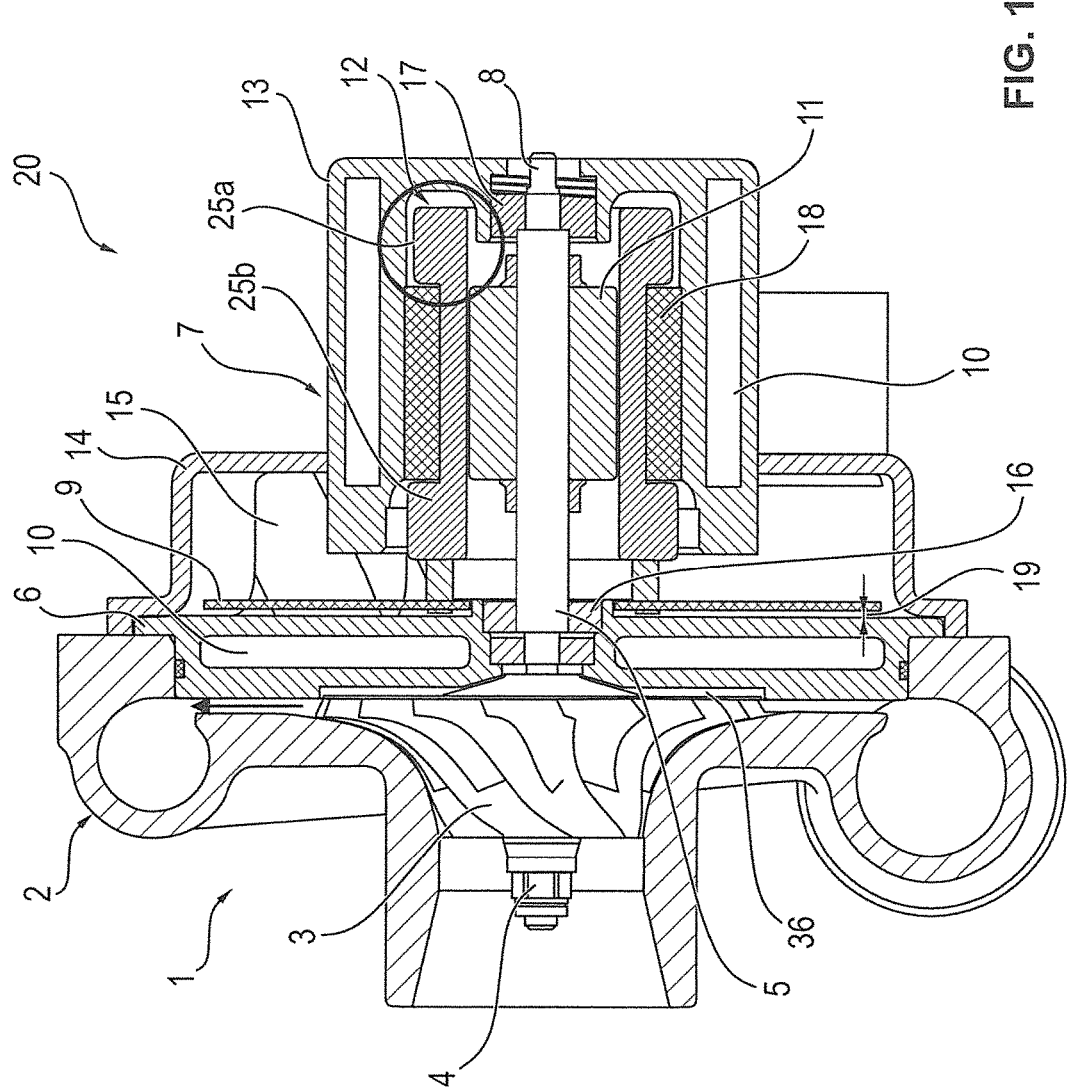
FIG. 1 shows a schematically slightly simplified sectional illustration through a first embodiment of a supercharging apparatus according to the invention.

FIG. 1 illustrates an embodiment of a supercharging apparatus comprising an electrically driven compressor 1. The compressor 1 has a compressor housing 2, in which a compressor wheel 3 is arranged. The compressor wheel 3 is fastened on one end 4 of a rotor shaft 5.

As further illustrated in FIG. 1, the compressor housing 2 has a compressor housing rear wall 6, which is in the form of a compressor housing cover in the embodiment illustrated. The compressor housing rear wall 6 is arranged behind the compressor wheel 3 and fixed on the compressor housing 2 and thus closes said compressor housing.

The compressor housing rear wall 6 is in this case provided with a cooling jacket 10, preferably for cooling water.

In addition, the compressor 1 has an electric motor 7. The electric motor 7 comprises a shaft 8, which is connected to a rotor shaft 5. In the embodiment illustrated, the shaft 8 and the rotor shaft 5 are embodied as an integral component part, as can be seen in detail in FIG. 1. In this case, the shaft 8 is in the form of a shaft stub, which has a smaller outer diameter than the rotor shaft 5 and on which a bearing 16 is arranged. The end 4 of the rotor shaft 5 is likewise reduced in comparison with the rotor shaft 5 in terms of its diameter and bears a second bearing 17. As can be seen from FIG. 1, the bearing 17 is supported on a bearing section of a stator housing 13, whereas the bearing 16 is supported with its outer ring in a cutout in the compressor housing rear wall 6.

In addition, a magnet 11 is provided on the rotor shaft 5, which magnet interacts with a stator winding 12 surrounding said magnet on the outside. More precise details are given in respect of the design of the stator winding 12 according to the invention in connection with FIGS. 3 and 4.

In addition, the embodiment of the compressor 1 shown in FIG. 1 has a dirt cover 14, which is fastened on the stator housing 13 or on the compressor housing rear wall 6 and in which electronics components 15 of a power electronics circuit 9 or electronics circuit board 9 are arranged. The power electronics circuit 9 can have all of the component parts necessary for performing the function of an electronic commutator. In particular, this involves a regulating circuit comprising transistors or so-called MOSFETs. In addition, the power electronics circuit 9 can comprise sensors, in particular Hall sensors. The electronics components 15 have, inter alia, in particular a capacitor.

As illustrated in FIG. 1, the power electronics circuit 9 is arranged between the compressor housing rear wall 6 and the electric motor 7 or the dirt cover 14. For this purpose, the power electronics circuit 9 can be clamped fixedly, for example, between the dirt cover 14 and the compressor housing rear wall 6 or else can be fastened on one of the two parts, for example adhesively bonded fixedly.

This arrangement results in the advantage that the power electronics circuit 9 is arranged adjacent to the cooling jacket 10, which markedly improves the cooling effect thereof with respect to the power electronics circuit 9.

A thermally conductive paste can be provided between the power electronics circuit 9 and the cooling jacket 10 or the compressor housing rear wall 6 in which the cooling jacket 10 is arranged.

The compressor housing rear wall 6 could also be formed by an end wall of the stator housing 13, in which the bearing 17 would then be arranged. In this embodiment, the stator housing 13 likewise has internal cooling and therefore a cooling jacket 10, wherein, in this embodiment too, the power electronics circuit 9 is arranged between the compressor housing rear wall 6 and the electric motor 7 or its stator housing 13 and therefore enjoys the same advantages of a compact design and improved cooling of the component parts.

Figure 2:
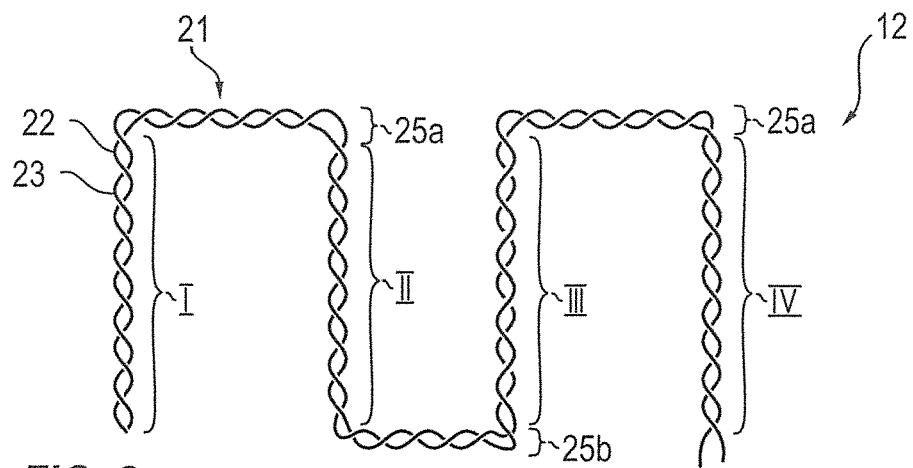
FIG. 2 shows a schematic illustration of completely twisted litz wires of a stator winding in accordance with the prior art.

FIG. 2 shows a first litz wire 22 and a second litz wire 23 of a line 21. The first litz wire 22 and the second litz wire 23 are twisted with one another both in successive magnetically active sections I, II, III and IV and in interposed end winding regions 25*a*, 25*b*. In other words, the litz wires 22, 23 have a first degree of twisting in the respective magnetically active section I, II, III and IV, which first degree of twisting is identical to the second degree of twisting in the end winding region 25*a*, 25*b*. Although the illustrated twisting is able to avoid compensation currents ("circulating currents") between the litz wires 22, 23, firstly additional volume is taken up in the magnetically active sections I, II, III and IV, and secondly a mechanical strength of the line 21 is already formed prior to the shaping of the stator winding 12, and this mechanical strength may be a hindrance during shaping of the stator winding 12.

Figure 3:
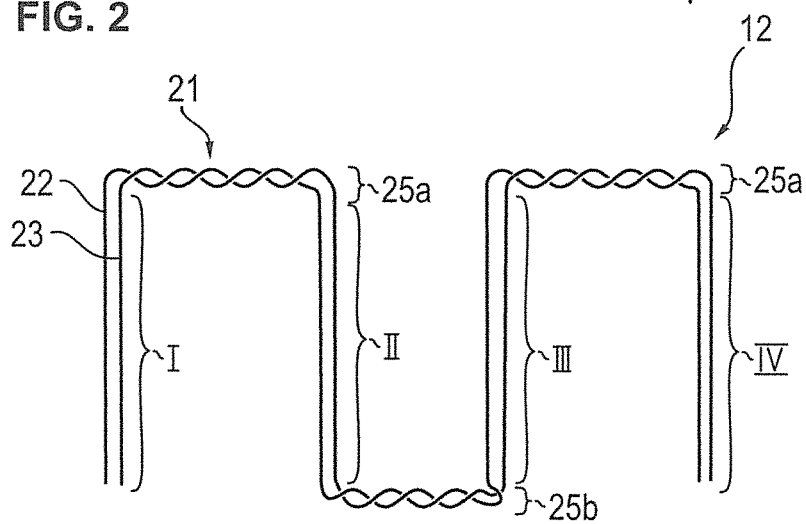
FIG. 3 shows a schematic illustration of litz wires twisted only in the end winding of a line of a stator winding in accordance with an exemplary embodiment of the present invention.

FIG. 3 shows a stator winding 12 which is configured in accordance with the invention. What are shown are the litz wires 22, 23 of the line 21 in the end winding region 25*a*, 25*b*, as illustrated in FIG. 2, twisted with one another, while they run parallel next to one another untwisted in the magnetically active sections I, II, III and IV. In this case, they each change the relative sequence with respect to one another in successive magnetically active sections I, II, III and IV. While the first litz wire 22 in the first magnetically active section I is arranged on the left (in the figure) or at the front in the circumferential direction U, in the second magnetically active section II it is arranged behind the second litz wire 23, in respect of the circumferential direction U. The change in sequence between the litz wires 22, 23 changes continuously in the circumferential direction U.

Figure 4:
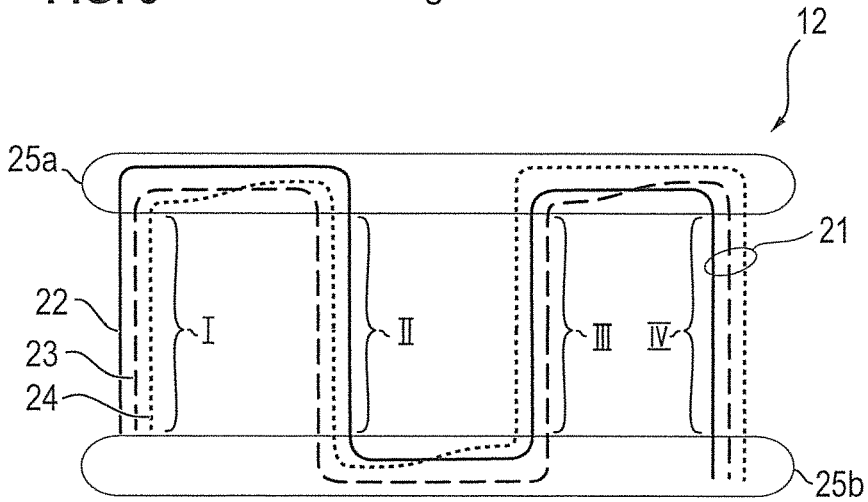
FIG. 4 shows a further schematic illustration of a line comprising three litz wires of a stator winding in accordance with an exemplary embodiment of the present invention.

FIG. 4 shows the arrangement proposed in FIG. 3 in which the line 21 has three litz wires 22, 23, 24. The sequence of litz wires 22, 23, 24 changes in the circumferential direction according to each magnetically active section I, II, III and IV. For this purpose, the twisting in the end winding region 25*a*, 25*b* is at a minimum by virtue of in each case only two litz wires 22, 23, 24 being represented as crossing over one another.

Figure 5:
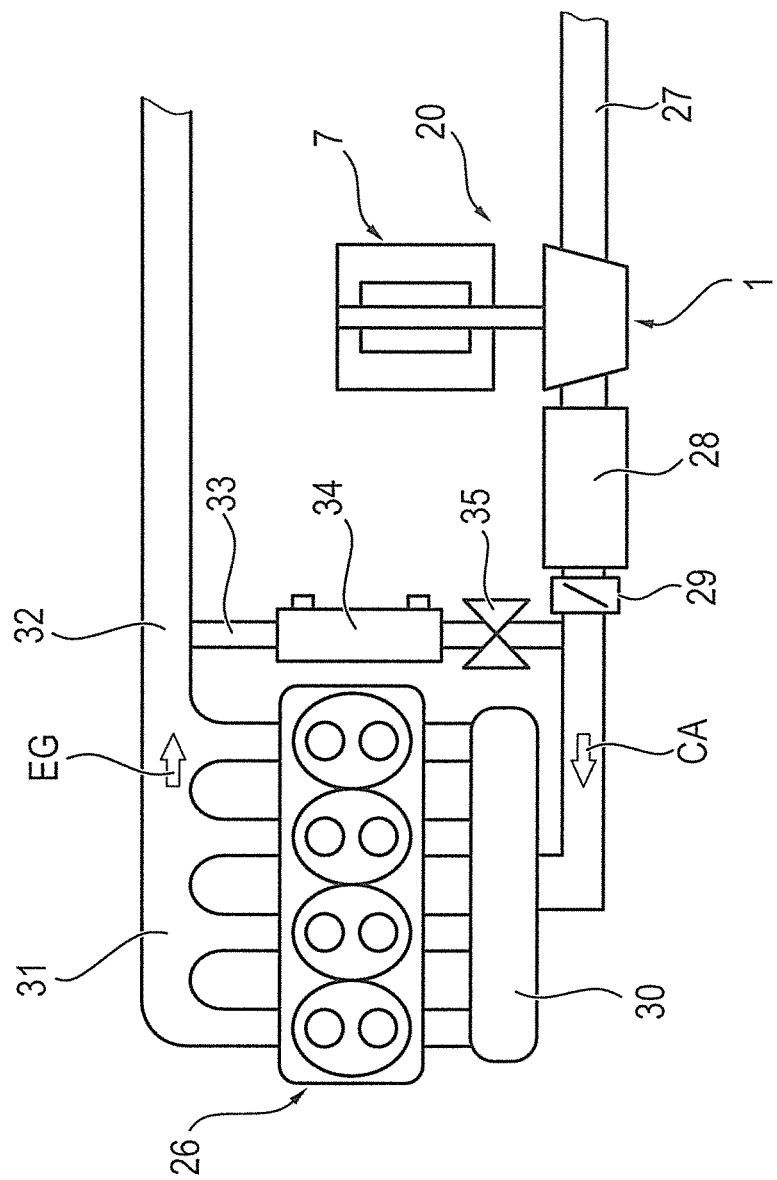
FIG. 5 shows a schematically very simplified illustration of a combustion engine which can be provided with a supercharging apparatus according to the invention.

FIG. 5 shows a schematically very simplified illustration of a combustion engine 26, for example in the form of an internal combustion engine (diesel engine or Otto engine). The combustion engine 26 has a suction line 27, in which the compressor 1 of the supercharging apparatus 20 is arranged, which compressor is driven by the electric motor 7. Downstream of the compressor 1, a charging air cooler 28 and, adjacent thereto, a throttle 29 can be arranged in the suction line 27. The air (symbolized by the arrow CA) compressed by the compressor 1 is supplied to a suction manifold 30, from where the cylinder of the combustion engine 26 is supplied with the compressed air.

The exhaust gas EG is supplied to an exhaust gas line 32 via an exhaust gas manifold 31.

In the particularly preferred embodiment illustrated in FIG. 5, the internal combustion engine 26 is furthermore provided with an exhaust gas return line 33, in which an exhaust gas cooler 34 and a valve 35 are arranged. The exhaust gas return line 33 with its components 34 and 35 is not obligatory, however, but merely represents a particularly preferred embodiment.

In addition to the written description of the invention above, explicit reference is hereby made to the illustration of the drawings of the invention in FIGS. 1, 3, 4 and 5 as supplementary disclosure to said description.

LIST OF REFERENCE SYMBOLS

1 Compressor
2 Compressor housing
3 Compressor wheel
4 End
5 Rotor shaft
6 Compressor housing rear wall
7 Electric motor, in particular brushless DC motor
8 Shaft
9 Power electronics circuit/electronics circuit board
10 Cooling jacket
11 Magnet
12 Stator winding
13 Stator housing
14 Dirt cover
15 Electronics component parts
16, 17 Bearings
18 Iron ring
19 Gap
20 Supercharging apparatus
21 Line
22 to 24 Litz wires
25a, 25b End winding region
26 Combustion engine
27 Suction line
28 Charging air cooler
29 Throttle
30 Suction manifold
31 Exhaust gas manifold
32 Exhaust gas line
33 Exhaust gas return line
34 Exhaust gas cooler
35 Valve
36 Compressor wheel rear
I to IV Magnetically active section

The invention claimed is:

1. A supercharging apparatus (20) for a combustion engine (26), comprising
an electrically drivable compressor (1) which has a compressor housing (2),
in which a compressor wheel (3) is arranged, which compressor wheel is fastened on one end (4) of a rotor shaft (5), and
which has a compressor housing rear wall (6) which is adjacent to a compressor wheel rear (36) and is fastened on the compressor housing (2);
an electric motor (7) comprising a shaft (8) which is connected to the rotor shaft (5); and
a stator winding (12), which comprises a line (21) formed from a multiplicity of litz wires (22, 23, 24),
wherein
the litz wires (22, 23, 24) of the line (21) have a first degree of twisting in an end winding region (25) of the stator winding (12) and have a second degree of twisting in a magnetically active section (I, II, III, IV), wherein the first degree of twisting is higher than the second degree of twisting, and
by the twisting of the litz wires (22, 23, 24) of the line (21) in the end winding region (25) a targeted change in the sequence of litz wires (22, 23, 24) between subsequent magnetically active sections of a multiplicity of magnetic sections (I, II, III, IV) is performed to account for the occurrence of eddy currents and circulating currents such that each litz wire (22, 23, 24) experiences the same induction at a respective point in time when a rotor is rotated within the stator winding (12).

2. The supercharging apparatus (20) as claimed in claim 1, wherein the first degree of twisting is at least twice as high as the second degree of twisting.

3. The supercharging apparatus (20) as claimed in claim 1, wherein the litz wires (22, 23, 24) have no twisting in at least one of the multiplicity of magnetically active sections (I, II, III, IV) of the line (21).

4. The supercharging apparatus (20) as claimed in claim 1, wherein the stator winding (12) is a winding without an iron core.

5. The supercharging apparatus (20) as claimed in claim 1, wherein the litz wires (22, 23, 24) of the line (21) are mechanically connected to one another by means of baked enamel.

6. The supercharging apparatus (20) as claimed in claim 1, wherein the litz wires (22, 23, 24) of the line (21) are assigned to a common electrical phase.

7. The supercharging apparatus (20) as claimed in claim 1, wherein the electric motor (7) is a 12 V electric machine.

8. The supercharging apparatus (20) as claimed in claim 1, wherein the electric motor (7) has a pole pair number of 1, 2, 3 or 4.

9. The supercharging apparatus (20) as claimed in claim 1, wherein the combustion engine (21) is an internal combustion engine.

10. The supercharging apparatus (20) as claimed in claim 1, wherein the first degree of twisting is at least four times as high as the second degree of twisting.

11. The supercharging apparatus (20) as claimed in claim 1, wherein the litz wires (22, 23, 24) have no twisting in more than one of the multiplicity of magnetically active sections (I, II, III, IV) of the line (21).

12. The supercharging apparatus (20) as claimed in claim 1, wherein the litz wires (22, 23, 24) have no twisting in all of the multiplicity of magnetically active sections (I, II, III, IV) of the line (21).

13. The supercharging apparatus (20) as claimed in claim 1, wherein the litz wires (22, 23, 24) of the line (21) are assigned to a three-phase supply voltage.

14. A supercharging apparatus (20) for a fuel cell, comprising
- an electrically drivable compressor (1) which has a compressor housing (2),
  - in which a compressor wheel (3) is arranged, which compressor wheel is fastened on one end (4) of a rotor shaft (5), and
  - which has a compressor housing rear wall (6) which is adjacent to a compressor wheel rear (36) and is fastened on the compressor housing (2);
- an electric motor (7); and
- a stator winding (12), which comprises a line (21) formed from a multiplicity of litz wires (22, 23, 24),
- wherein
- the litz wires (22, 23, 24) of the line (21) have a first degree of twisting in an end winding region (25) of the stator winding (12) and have a second degree of twisting in a magnetically active section (I, II, III, IV), wherein the first degree of twisting is higher than the second degree of twisting, and
- by the twisting of the litz wires (22, 23, 24) of the line (21) in the end winding region (25) a targeted change in the sequence of litz wires (22, 23, 24) between subsequent magnetically active sections of a multiplicity of magnetic sections (I, II, III, IV) is performed to account for the occurrence of eddy currents and circulating currents such that each litz wire (22, 23, 24) experiences the same induction at a respective point in time when a rotor is rotated within the stator winding (12).

* * * * *